US009162625B2

(12) United States Patent
Watanabe et al.

(10) Patent No.: US 9,162,625 B2
(45) Date of Patent: Oct. 20, 2015

(54) STRUCTURE FOR VEHICLE BODY LATERAL SECTION

(71) Applicant: HONDA MOTOR CO., LTD., Minato-Ku, Tokyo (JP)

(72) Inventors: Yasunori Watanabe, Wako (JP); Kenichi Kitayama, Wako (JP); Shigeyuki Nagai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/402,000

(22) PCT Filed: Feb. 7, 2013

(86) PCT No.: PCT/JP2013/052839
§ 371 (c)(1),
(2) Date: Nov. 18, 2014

(87) PCT Pub. No.: WO2013/175812
PCT Pub. Date: Nov. 28, 2013

(65) Prior Publication Data
US 2015/0210219 A1    Jul. 30, 2015

(30) Foreign Application Priority Data

May 22, 2012   (JP) ................... 2012-116784

(51) Int. Cl.
*B60R 13/04*   (2006.01)
*B60R 3/00*    (2006.01)
(Continued)

(52) U.S. Cl.
CPC ............... *B60R 3/00* (2013.01); *B60J 10/081* (2013.01); *B60R 13/04* (2013.01); *B62D 25/025* (2013.01); *B60R 2013/046* (2013.01)

(58) Field of Classification Search
CPC ...... B60R 13/04; B60R 13/046; B60R 13/06; B60R 2013/046; B60R 3/002; B60R 3/00; B60R 3/04; B62D 25/025
See application file for complete search history.

(56) References Cited

U.S. PATENT DOCUMENTS 2,281,586 A * 5/1942 Kramer ............... B60J 10/0062
296/146.9
2,358,206 A * 9/1944 Boersma ............... B60R 3/002
24/297

(Continued)

FOREIGN PATENT DOCUMENTS

GB   2474742 A1   4/2011
JP   H03-71980 U  7/1991
(Continued)

*Primary Examiner* — Katy M Ebner
*Assistant Examiner* — Emma K Frick
(74) *Attorney, Agent, or Firm* — Carrier Blackman & Associates, P.C.; Joseph P. Carrier; William D. Blackman

(57) ABSTRACT

A vehicle body includes a side sill connected by overlapping a plurality of plates. In an area of the side sill positioned in a door opening, a step garnish covers at least a portion of such area. The step garnish is formed of a hard resin garnish main body and a soft resin garnish end part. The garnish main body covers from the upper surface of the side sill through a lateral surface that includes a sealing contact part. The garnish end part is integrally formed with an end of the garnish main body, and covers at least the sealing contact part. The thickness of the garnish end part gradually decreases from a proximal end formed integrally with the garnish main body towards the distal end. Such arrangement improves appearance of the door opening and sealing characteristics of the area surrounding the door opening.

6 Claims, 13 Drawing Sheets

(51) Int. Cl.
 *B62D 25/02* (2006.01)
 *B60J 10/08* (2006.01)

(56) References Cited

U.S. PATENT DOCUMENTS

| | | | | |
|---|---|---|---|---|
| 2,657,948 | A * | 11/1953 | Sturtevant | B60N 3/04 16/4 |
| 2,997,329 | A * | 8/1961 | Chapman | B60R 13/04 296/191 |
| 5,304,409 | A * | 4/1994 | Nozaki | B60J 10/0005 292/DIG. 70 |
| 5,571,581 | A * | 11/1996 | Koizumi | B29C 45/1642 293/128 |
| 5,671,967 | A * | 9/1997 | Gurganus | B60R 13/0206 296/146.9 |
| 6,196,623 | B1 * | 3/2001 | Shackelford | B60J 10/08 296/199 |
| 6,264,268 | B1 * | 7/2001 | Goodger | B60R 13/04 280/770 |
| 6,789,841 | B2 * | 9/2004 | Benkler | B60R 13/04 296/209 |
| 7,168,757 | B2 * | 1/2007 | Futatsuhashi | B60R 13/04 296/193.05 |
| 7,234,764 | B2 * | 6/2007 | Aizawa | B60R 13/04 180/274 |
| 7,648,194 | B2 | 1/2010 | Hirasawa et al. | |
| 7,884,704 | B2 * | 2/2011 | Iwano | B60J 5/0427 340/435 |
| 7,896,397 | B2 * | 3/2011 | Rompage | B60R 13/04 280/154 |
| 8,313,135 | B2 * | 11/2012 | Iida | B60J 10/081 296/146.9 |
| 8,770,812 | B2 * | 7/2014 | Kino | B60Q 1/323 362/23.17 |
| 2005/0213351 | A1 * | 9/2005 | Yang | B60Q 1/323 362/633 |
| 2006/0176711 | A1 * | 8/2006 | Wang | B60Q 1/323 362/555 |
| 2014/0119038 | A1 * | 5/2014 | Mulder | G09F 13/06 362/509 |

FOREIGN PATENT DOCUMENTS

| | | |
|---|---|---|
| JP | H05-46586 U | 6/1993 |
| JP | H11-310083 A | 11/1999 |
| JP | 2007-313918 A | 12/2007 |
| JP | 2011-088532 A | 5/2011 |
| JP | 2011-195107 A | 10/2011 |
| JP | 2011-195109 A | 10/2011 |

* cited by examiner

STRUCTURE FOR VEHICLE BODY LATERAL SECTION

TECHNICAL FIELD

The present invention relates to an improvement of a technique for covering the lower edge of a door opening, formed in a side section of a vehicle body, with a step garnish.

BACKGROUND ART

Door openings to be opened and closed by side doors are formed in side sections of ordinary vehicles, such as passenger automobiles. Generally, the lower edge of such a door opening is set at a low height to allow a passenger to get in and out of the vehicle with ease. The lower edge of the door opening is defined, for example, by the upper surface of a side sill. A construction of a side sill is disclosed, for example, in Patent Literature 1. Further, a technique for covering the lower edge of a door opening with a step garnish is disclosed, for example, in Patent Literature 2.

A vehicle body disclosed in Patent Literature 1 is constructed of plate materials differing among various portions of the vehicle body and such different plate materials are joined together, in order to achieve an enhanced quality and reduced weight. For example, lower end portions of a center pillar and a rear pillar are lapped over and joined to a side sill. Namely, a part of the side sill is constructed by the plate materials, forming the center pillar and the rear pillar, being lapped over the plate material forming the side sill. Thus, the side sill has a stepped joint section where the plate materials are lapped over and joined to each other.

Generally, a seal member is provided on the peripheral edge of the vehicle door. With the door in a closed position, the seal member contacts and seals an outer side surface, located outward in a vehicle width direction, of the side sill. If the side sill has a joint section as in the vehicle body disclosed in Patent Literature 1, the joint section would adversely influence the sealing performance of the sealing member. Further, in the case where the lower edge of the door opening is defined by the upper surface of the side sill and if the joint section is exposed on the upper surface of the side sill, the joint section is undesirably visible from outside. Therefore, a further improvement has to be made in order to enhance the outer appearance of the vehicle body.

Further, a vehicle body disclosed in Patent Literature 2 has a step plate (step garnish) provided on the lower edge of the door opening. The step plate is an aluminum plate constructed to allow a foot (or feet) of a passenger to be placed thereon and covered along its outer periphery with a decorative resin cover. Such a decorative resin cover can enhance the outer appearance of the step plate.

Further, merely combining the technique disclosed in Patent Literature 2 with the technique disclosed in Patent Literature 1 cannot enhance the sealing performance provided by the seal member in the joint section of the side sill, nor can it enhance the outer appearance of the lower edge of the door opening.

PRIOR ART LITERATURE

Patent Literature 1 Japanese Patent Application Laid-Open Publication No. 2011-195107
Patent Literature 2: Japanese Patent Application Laid-Open Publication No. H11-310083

SUMMARY OF INVENTION

Technical Problem

It is therefore an object to provide a technique which is applied to a vehicle body including a side sill having a joint section where a plurality of plate materials are lapped over and joined to each other and which can enhance sealing performance along the periphery of a door opening.

Solution to Problem

According to claim 1 of the instant application, there is provided an improved vehicle side body structure including: a side sill provided in a lower portion of a side section of a vehicle body and extending in a front-rear direction of the vehicle body; and a door opening formed in the side section of the vehicle body; the lower edge of the door opening being defined by the upper surface of the side sill, the side sill having a joint section where a plurality of plate materials are lapped over and joined to each other, the door opening being opened and closed by a door having a door seal member on the lower edge portion of the door, wherein, when the door is in a closed position, the door seal member seals the door by contacting a seal contact portion on an upper portion of an outer side surface, located outward in a vehicle with direction, of the side sill, characterized in that a step garnish is provided on a portion of the side sill adjacent to the door opening, the step garnish covering at least a part of the portion of the side sill in such a manner as to allow a foot of a passenger to be placed thereon, the step garnish is an integrally-molded member including a garnish body formed of hard resin and a garnish end section formed of soft resin, the garnish body covers a region from the upper surface of the side sill to the upper portion of the side surface including the seal contact portion and covers the joint section as well, the garnish end section is formed integrally with an end, in the front-rear direction of the vehicle body, of the garnish body and covering at least the seal contact portion, a thickness of the garnish end section gradually decreases from the proximal end thereof formed integrally with the garnish body toward the distal end thereof.

Preferably in the invention recited in claim 2, a thickness of the garnish body gradually decreases in such a manner that the thickness gradually decreases continuously from a middle portion of the garnish body to the distal end of the garnish end section.

Preferably, in the invention recited in claim 3, before being mounted on the side sill, the step garnish is curved in a given direction such that a middle portion thereof is spaced from the upper surface and the side surface of the side sill, so that, when the step garnish is mounted on the side sill, an edge of the step garnish resiliently contacts the upper surface and the side surface of the side sill.

Preferably, in the invention recited in claim 4, of a distal end part of the garnish end section, a portion contacting the upper surface of the side sill has a greater thickness than a portion contacting the seal contact portion.

Preferably, in the invention recited in claim 5, of the outer side surface, located outward in the vehicle with direction, of the side sill, a portion not covered with the garnish body is covered with a side sill garnish, and wherein the garnish body has a lower flange extending outward in the vehicle width direction from the lower end of a side wall, covering the side surface of the side sill, along the upper surface of the side sill garnish, and the lower flange is placed on the upper surface of the side sill garnish.

Preferably, in the invention recited in claim 6, an opening seal member is provided on the lower edge of the door opening, and the opening seal member is a member for sealing the door by the lower edge of the inner surface of the door contacting the opening seal member when the door is in the closed position. The garnish body has an upper flange extending upward from the inner end, in the vehicle width direction, of an upper wall covering the upper surface of the side sill, and the upper end of the upper flange is located near the lower end of the opening seal member.

Advantageous Effects of Invention

In the invention recited in claim 1, the step garnish is an integrally-molded member and the garnish end section. The garnish body covers the region from the upper surface of the side sill to the upper portion of the side surface including the seal contact portion and covers the joint section as well. The joint section, where at least two plate materials are lapped over and joined to each other, constitutes a part of the side sill. The joint section of a stepped shape (stepped joint section) located on the lower edge of the door opening is covered with the garnish body, so that the present invention can achieve an enhanced outer appearance of the lower edge of the door opening. Besides, because the garnish body is formed of hard resin, it has rigidity great enough to allow a foot (or feet) of a passenger to be placed on the garnish body.

The upper portion of the outer side surface, located outward in the vehicle with direction, of the side sill is covered with the garnish body. A level difference corresponding to the thickness of the garnish body is formed between an end, in the front-rear direction of the vehicle body, of the garnish body and the upper portion of the side surface of the side sill. By contrast, the garnish end section is formed of soft resin and thus has considerable flexibility. Besides, the thickness of the garnish end section gradually decreases from the proximal end, formed integrally with the garnish body, toward the distal end. Namely, the garnish end section is formed integrally with one of the ends, in the front-rear direction of the vehicle body, of the garnish body and covers at least the seal contact portion. Namely, the garnish end section has a gently sloping shape so as to avoid formation of a level difference. Thus, no gap is left between the upper portion of the outer side surface of the side sill and the door seal member. As a result, the present invention can enhance sealing performance between the door opening and the door.

With the aforementioned arrangements, the invention of claim 1 can not only enhance the outer appearance of the lower edge of the door opening but also enhance the sealing performance along the periphery of the door opening.

In the invention recited in claim 2, the thickness of the garnish body gradually decreases continuously from the middle portion of the garnish body to the distal end of the garnish end section. Namely, the thickness of the garnish body is smaller at the end in the front-rear direction of the vehicle body than at the middle portion. Thus, the thickness of the proximal end of the garnish end section can be reduced by an amount corresponding to the reduced thickness of that end in the front-rear direction. Further, a length of the garnish end section from the proximal end to the distal end can be reduced by an amount corresponding to the reduced thickness of the proximal end. Because of the reduced length of the garnish end section, it is possible to fill molten resin evenly into a cavity of a mold for forming the garnish end section on the garnish body. Because the molten resin can be filled into the mold cavity in an appropriate manner like this, it is possible to achieve an enhanced quality of the garnish end section.

Further, in the invention recited in claim 3, the step garnish is formed of resin so that it is resiliently deformable. Before being mounted on the side sill, the step garnish is curved in the given direction such that its middle portion is spaced from the upper surface and the side surface of the side sill. The middle portion of the step garnish is lapped over the upper surface and side surface of the side sill by being placed over the upper surface and side surface of the side sill and pressed against the resiliency of the step garnish. The step garnish is mounted on the side sill in the aforementioned state. With the step garnish mounted on the side sill, the distal end of the garnish end portion is resiliently pressed against, the upper surface and side surface of the side sill and thus can be kept in close contact with the upper surface and side surface with no gap left between the distal end of the garnish end section and the upper surface and side surface. With no gap between the distal end of the garnish end section and the upper surface and side surface, it is possible to even further enhance the outer appearance of the lower edge of the door opening and the sealing performance along the periphery of the door opening.

Further, in the invention of claim 4, of the distal end part of the garnish end section, the portion contacting the upper surface of the side sill has a greater thickness than the portion contacting the seal contact portion. Namely, the portion of the garnish end section contacting the seal contact portion has a smaller thickness such that no gap is left between that portion and the door seal member. The potion contacting the upper surface of the side sill, on the other hand, may be formed to have a greater thickness than the portion of the garnish end section contacting the door seal member, because the potion contacting the upper surface of the side sill it is provided only for the purpose of enhancing the outer appearance of the lower edge of the door opening. Because the potion contacting the upper surface of the side sill has a greater thickness, it is possible to fill molten soft resin evenly into a portion, corresponding to the distal end, of the mold cavity. Because the molten resin can be filled into the mold cavity in a more appropriate manner as noted above, the present invention can achieve an enhanced overall quality of the garnish end section. As a result, the present invention can even further enhance an overall rigidity of the garnish end section.

Further, in the invention of claim 5, of the outer side surface, located outward in the vehicle with direction, of the side sill, the portion not covered with the garnish body is covered with the side sill garnish. The garnish body has the lower flange extending outward in the vehicle width direction from the lower end of the side wall, covering the side surface of the side sill, along the upper surface of the side sill garnish, and the lower flange is placed on the upper surface of the side sill garnish. Because frictional resistance is produced between the lower flange and the upper surface of the side sill garnish, the side wall of the garnish body can be prevented from deforming laterally outwardly in the vehicle width direction. Besides, because the lower, flange extends outward in the vehicle width direction from the lower end of the side wall and is placed on the upper surface of the side sill garnish, a gap, if any, between the lower end of the side wall and the upper surface of the side sill garnish is hardly visible, and thus, the present invention can even further enhance the outer appearance of the lower edge of the door opening.

Further, in the invention of claim 6, the garnish body has the upper flange extending upward from the inner end, in the vehicle width direction, of the upper wall covering the upper surface of the side sill, and the upper end of the upper flange is located near the lower end of the opening seal member provided on the lower edge of the door opening. When the door is closed, the opening seal member contacts the upper end of the upper flange while elastically deforming to collapse. Because the opening seal member is prevented from deforming downward by contacting the upper end of the upper flange, contact pressure between the opening seal member and the lower edge of the inner surface of the door increases. As a consequence, sealability between the lower edge of the inner surface of the door and the opening seal member increases so that waterproofness and sound insulation can be significantly increased. Particularly, when the door is in the closed position, it is possible to sufficiently secure double sealing by the door seal member and the opening seal member and thereby achieve a further increased waterproofness and sound insulation.

DESCRIPTION OF EMBODIMENTS

Now, preferred embodiments of a structure for vehicle body lateral section (i.e., vehicle side body structure) of the present invention will be described hereinbelow with reference to the accompanying drawings.

Figure 1:
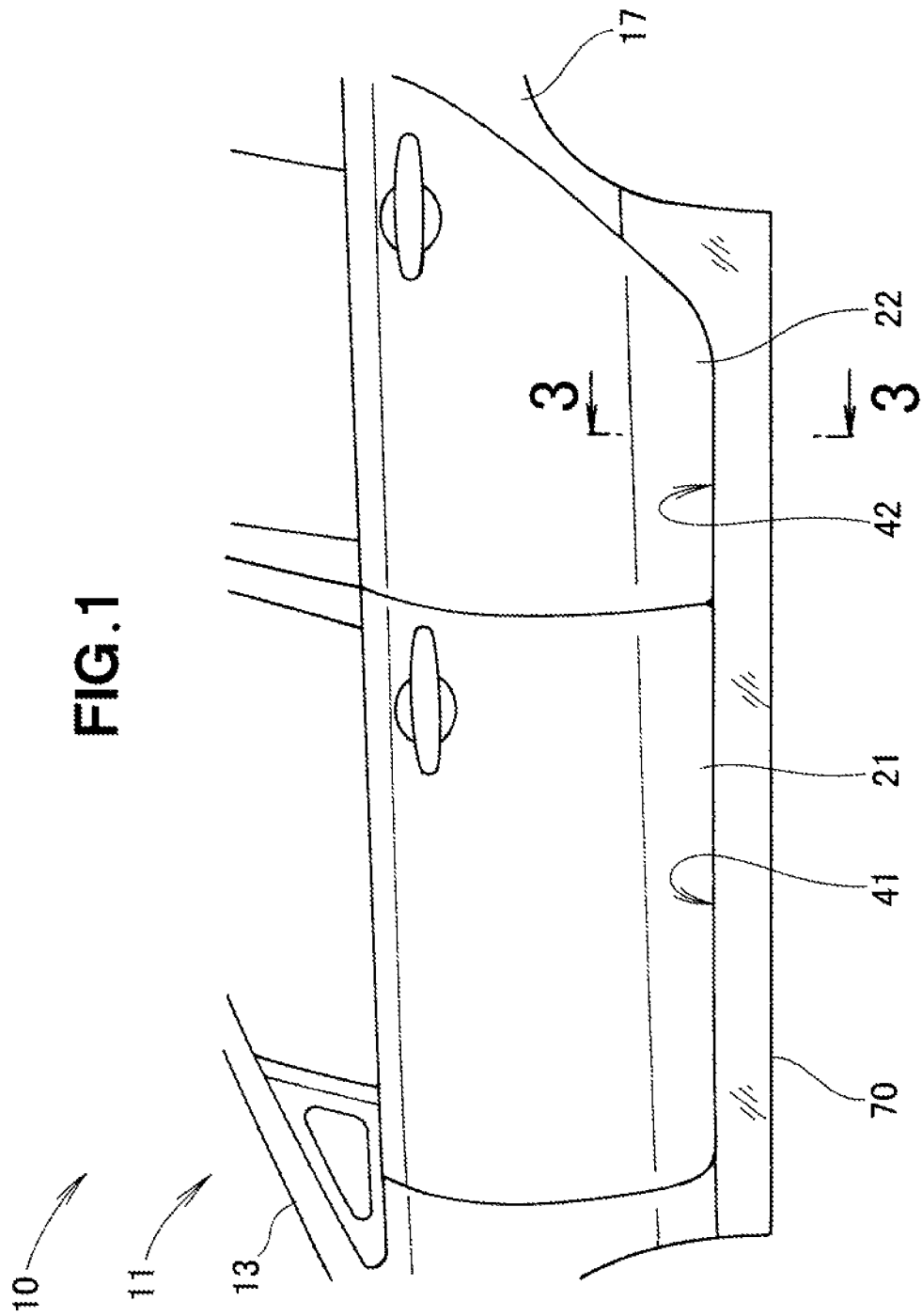
FIG. 1 is a side view showing a door and other components around the door in a side section of a vehicle body of an automobile according to an embodiment of the present invention.
Figure 2:
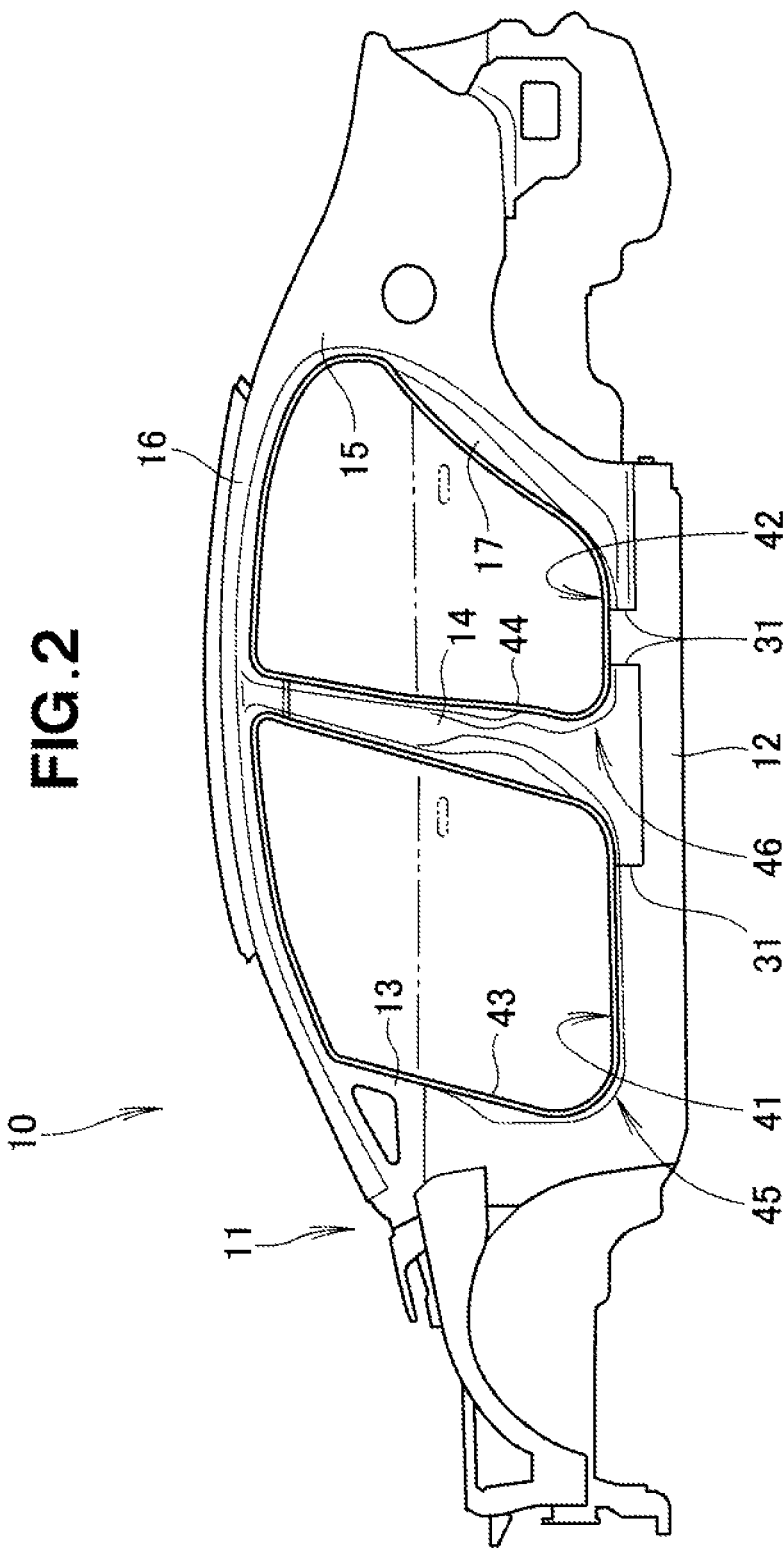
FIG. 2 is a side view of the vehicle body shown in FIG. 1.

As shown in FIGS. 1 and 2, an automobile 10 (vehicle 10) is a so-called four-door automobile or vehicle including left and right front doors 21 and left and right rear doors 22 on a vehicle body 11.

The vehicle body 11 includes left and right side sills 12, left and right front pillars 13, left and right center pillars 14, left and right rear pillars 15, and left and right roof side rails 16. The left and right side sills 12 are provided on left and right side sections of the vehicle body 11 and extend in a front-rear direction of the vehicle body 11. The left and right front pillars 13 extend upward from front end portions of the left and right side sills 12. The left and right center pillars 14 extend upward from longitudinal halfway portions of the left and right side sills 12. The left and right rear pillars 15 extend upward from rear end portions of the left and right side sills 12. The left and right roof side rails 16 are secured to and extend between the upper ends of the left and right front pillars 13, the left and right center pillars 14 and the left and right rear pillars 15.

As shown in FIG. 2, the vehicle body 11 is constructed of plate materials differing among various portions of the vehicle body 11 and such different plate materials are joined together, in order to achieve an enhanced quality and reduced weight of the vehicle body. For example, lower end portions of the left and right center pillars 14 and lower end portions of the left and right rear panels 17 are lapped over and joined to the left and right side sills 12. Namely, parts of the left and right side sills 12 are constructed by the plate materials, forming the left and right center pillars 14 and the left and right rear pillars 15, being lapped over the plate materials forming the left and right side sills 12. Thus, the left and right side sills 12 have stepped joint sections 31 where the plate materials are lapped over and joined to each other.

The following describe the left side sill 12. Because the right side sill 12 is of the same construction as the left side sill 12 except that it is shaped in left-right symmetric relation to the left side sill 12, description about the right side sill 12 is omitted here.

Figure 3:
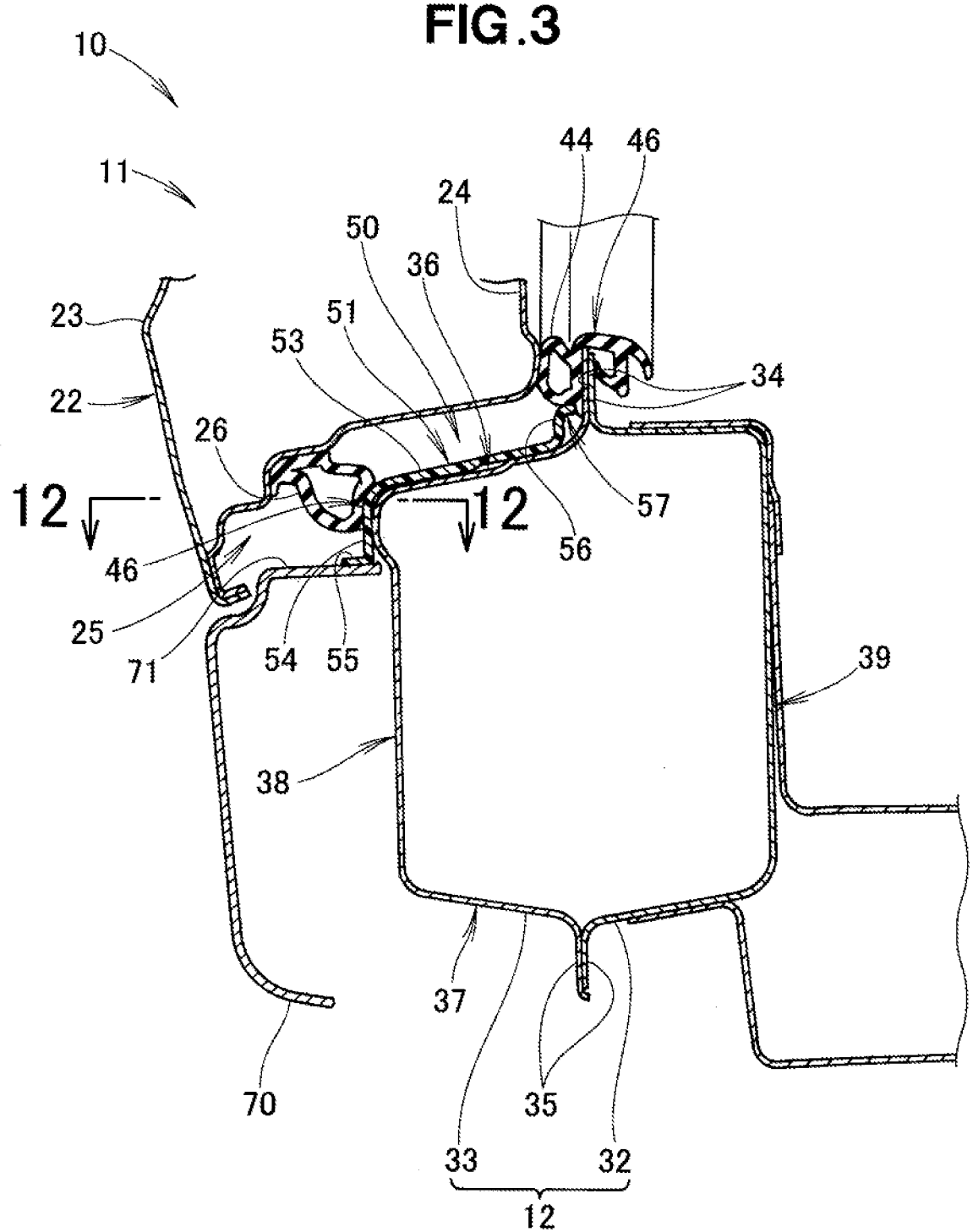
FIG. 3 is a sectional view taken along line 3-3 of FIG. 1.

As shown in FIGS. 2 and 3, the left side sill 12 has a substantially rectangular closed sectional shape uniform throughout its length in the front-rear direction of the vehicle body 11. Namely, the side sill 12 is a closed-sectional member having an inner side sill element 32 disposed inward in a vehicle width direction and an outer side sill element 33 disposed outward in the vehicle width direction.

Each of the inner side sill element 32 and the outer side sill element 33 has a generally hat-like sectional shape. More specifically, the inner side sill element 32 is formed in a substantially U shape opening outward in the vehicle width direction, and it integrally has an upper flange 34 extending upward from the upper end of the U-shape opening and a lower flange 35 extending downward from the lower end of the U-shape opening. The outer side sill element 33 is formed in a substantially U shape opening inward in the vehicle width direction, and it integrally has an upper flange 34 extending upward from the upper end of the opening and a lower flange 35 extending downward from the lower end of the opening. The side sill 12 is constructed by the upper flanges 34 of the inner and outer elements 32 and 33 being joined to each other and the lower flanges 35 of the inner and outer elements 32 and 33 being joined to each other.

The outer surface of the side sill 12 of a substantially rectangular closed sectional shape constructed in the aforementioned manner comprises four surfaces: a substantially horizontal, flat upper surface 36; a substantially horizontal, flat lower surface 37; a side surface 38 (outer surface 38) located outward in the vehicle width direction and extending substantially flatly and perpendicularly to the upper surface 36; and a side surface 39 (inner surface 39) located inward in the vehicle width direction and extending substantially flatly and perpendicularly to the upper surface 36. The lower flanges 35 extend downward from a widthwise middle portion of the lower surface 37.

As shown in FIG. 2, left and right front door openings 41 and left and right rear door openings 42 are formed in the left and right side sections of the vehicle body 11. These door openings 41 and 42 are each an entrance/exit opening for a passenger to get in and out of the vehicle. The lower edge of each of the door openings 41 and 42 is set at a low height to allow the passenger to get in and out of the vehicle with ease. More specifically the lower edge of each of the door openings 41 and 42 (opening's lower edge) is defined by the upper surface 36 of the left or right side sill 12.

Namely, the left and right front door openings 41 are each an opening surrounded by the left or right side sill 12, the left or right front pillar 13, the left or right center pillar 14 and the left or right roof side rail 16. Further, the left and right rear door openings 42 are each an opening surrounded by the left or right side sill 12, the left or right center pillar 14, the left or right rear pillar 15 and the left or right roof side rail 16.

Further, as shown in FIGS. 1, 2 and 3, an opening seal member (i.e., door opening seal) 43 is provided on and along the peripheral edge of each of the left and right front door openings 41, and each of the left and right front door openings 41 is opened and closed by a left or right front door 21. Further, an opening seal member (door opening seal) 44 is provided on and along the peripheral edge of each of the left and right rear door openings 42, and each of the left and right rear door openings 42 is opened and closed by a left or right rear door 22. These opening seal members 43 and 44 are each an annular rubber-made member. Namely, the opening seal members 43 and 44 are each an elastic member which, with the corresponding left or right door opening 41 or 42 closed, seals the interior of the vehicle body 11 from the outside by the inner peripheral edge (sealing surface) of the door 21 or 22 contacting the opening seal member 43 or 44.

Further, a seal contact portion (seal surface) 45 is formed along the peripheral edge of each of the left and right front door openings 41 so as to surround the outer periphery of the opening seal member 43. Similarly, a seal contact portion (seal surface) 46 is formed along the peripheral edge of each of the left and right rear door openings 42 so as to surround the outer periphery of the opening seal member 43. These seal contact portions 45 and 46 are each in the form of an annular flat surface formed along the peripheral edge of the corresponding door opening 41 or 42.

Each of the left and right front doors 21 is openably/closably mounted on the corresponding left or right front pillar 13 via not-shown hinges, and each of the left and right rear doors 22 is openably/closably mounted on the corresponding left or right center pillar 14 via not-shown hinges.

The following describe in detail the left rear door (side door) 22. Because the right rear door 22 is of the same construction as the left rear door 22 except that it is shaped in left-right symmetric relation to the left rear door 22, description about the right rear door 22 is omitted here. Further, because the left and right front doors (side doors) 21 are of generally the same construction as the left rear door 22 except that they differ in overall shape from the left rear door 22, description of the left and right front doors 21 is omitted here.

As shown in FIG. 3, the left door 22 is a hollow member comprising an outer door panel 23 and an inner door panel 24. A peripheral edge section 25 of the door 22 is formed by the edges of the outer and inner door panels 23 and 24 being joined to each other. A door seal member 26 is provided in the peripheral edge section 25 of the door 22.

The door seal member 26 is a rubber-made member formed in an annular shape along the peripheral edge of the door opening 42, and it is slightly greater in diameter than the opening seal member 44. Namely, the door seal member 26 is disposed so as to surround the outer periphery of the opening seal member 44, and this door seal member 26 is an elastic member which, with the door opening 42 closed with the door 22, seals the door by contacting a sealing contact portion 46 of the door opening 42. With the door opening 42 closed with the door 22, the peripheral edge of the door opening 42 is sealed doubly with the opening seal member 44 and the door seal member 26.

As stated above, the lower edge of each of the door openings 41 and 42 (opening's lower edge) is defined by the upper surface 36 of the left or right side sill 12. The left and right side sills 12 each have the stepped joint section 31 where the plate materials are lapped over and joined to each other. Thus, regions where such joint sections 31 overlap or traverse the seal contact portions 46 have level differences. Further, the stepped joint sections 31 on the side sills 12 would adversely influence the sealing performance of the door seal members 26. Furthermore, because the lower edges of the door openings 42 are defined by the upper surfaces 36 of the side sills 12, the joint sections 31 are visible from the outside if exposed on the upper surfaces 36, thus adversely influencing the sealing performance To avoid such inconveniences, the instant embodiment includes a step garnish 50 provided on a portion of each of the side sills 12 adjacent to the corresponding door opening and covering at least, a part of the portion of the side sill 12. The passenger can put its foot (feet) on the step garnish 50. The following describe in more detail the step garnish 50.

Figure 4:
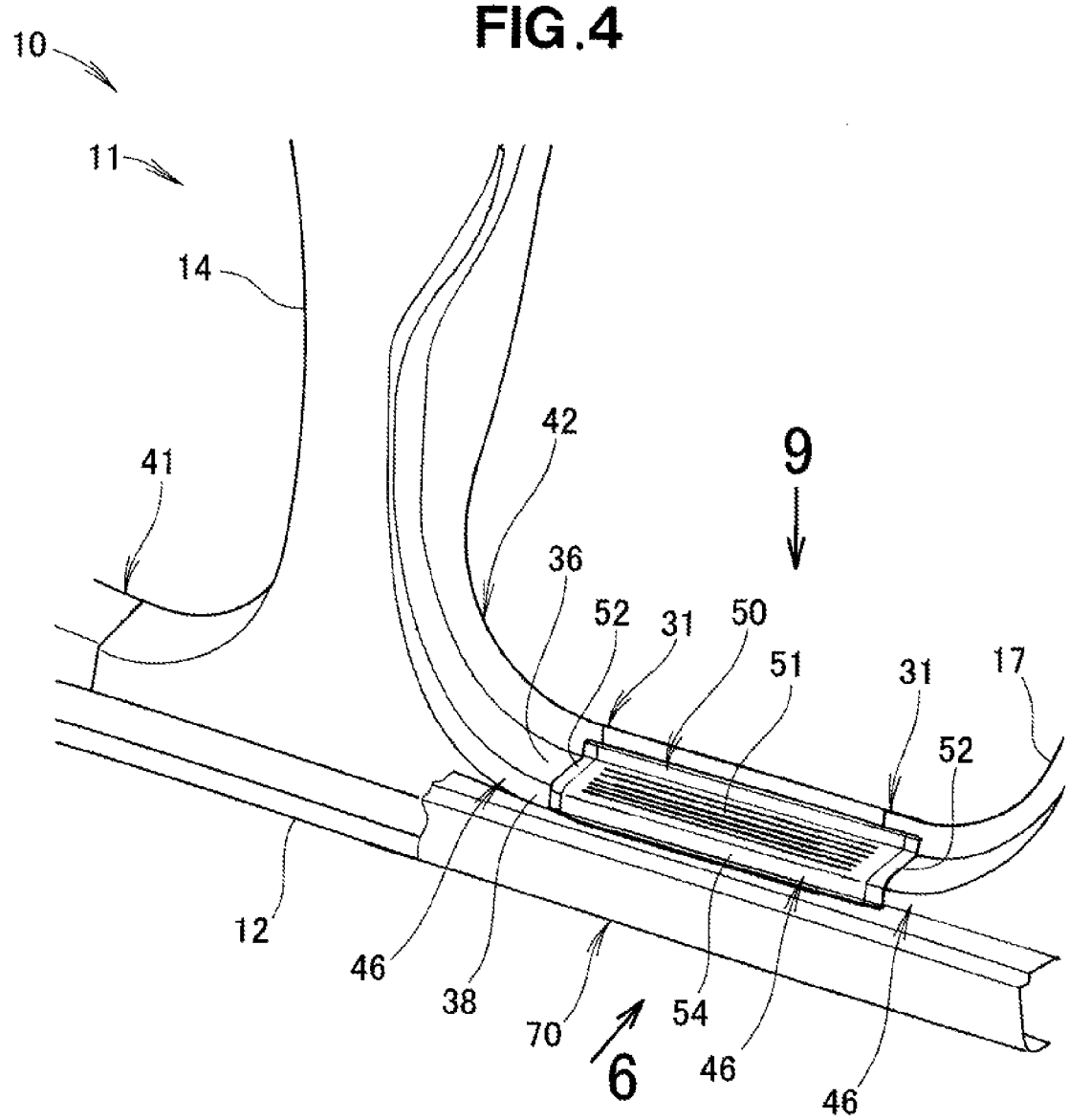
FIG. 4 is a perspective view of a construction where a side sill garnish and a step garnish are mounted on a side sill shown in FIG. 2.

As shown in FIG. 4, the step garnish 50 is provided in such a manner as to cover the upper surface 36 of the side sill 12 and an upper portion of the outer side surface 38 located outward in the vehicle width direction. The step garnish 50 is an integrally-molded member that comprises a garnish body 51 and garnish end portions formed of soft resin. The step garnish 50 extends along the lower edge of the door opening 42 and covers the joint section 31 on the upper surface 36 of the side sill 12 and the joint section 31 on the side surface 38. Because these joint sections 31 are invisible from the outside by being covered with the step garnish 50, the outer appearance of the vehicle body 11 can be enhanced.

The side surface 38 of the side sill 12 beneath the step garnish 50 is covered with a side sill garnish 70 laterally from outside in the vehicle width direction. The side sill garnish 70 is a member extending along the side sill 12 beneath the door opening 41 or 42 to a portion beneath the center pillar 14.

Further, as shown in FIGS. 3 and 4, the garnish body 51 includes: an upper wall 53 covering the upper surface 36 of the side sill 12; a side wall 54 extending from the outer end, in the vehicle width direction, of the upper wall 53; a lower flange 55 extending outward in the vehicle width direction from the lower end of the side wall 54; and an upper flange 56 extending upward from the inner end, in the vehicle width direction, of the upper wall 53. The upper flange 56 has an upper bent portion 57 bent inward, in the vehicle width direction, from its upper end portion.

When the door 22 is in the closed position, the opening seal member 44 also contacts the upper bent portion 57 of the upper flange 56 to elastically deform and thereby seals between the door 22 and the step garnish 50, which can achieve an even further enhanced sealability.

The side wall 54 covers an upper portion of the side wall 38 of the side sill 12. The lower flange 55 is placed on and extends along the upper surface 71 of the side sill garnish 70. With the lower flange 55 placed on the upper surface 71 of the side sill garnish 70 like this, a gap between the side sill garnish 70 and the side sill 12 can be concealed, which can achieve an enhanced outer appearance. Further, because frictional resistance is produced between the lower flange 55 and the upper surface 71 of the side sill garnish 70, the side wall 54 can be prevented from deforming laterally outwardly in the vehicle width direction due to external force applied to the garnish body 51, for example, as the door is closed The door seal member 26 is provided in the peripheral edge section 25 of the door 22. When the door 22 is in the closed position, the door seal member 26 is pressed against and seals the seal contact portion 46 of the side surface 38 located outward in the vehicle width direction, of the side sill 12 and the seal contact portion of the side wall 54 of the step garnish 50.

Whereas the instant embodiment has been described above in relation to the case where the step garnish 50 is provided adjacent to the left rear door opening 42 of the vehicle body 11, the present invention is not so limited, and such a step garnish 50 may be provided adjacent to all of the left and right front door openings 41 and left and right rear door openings 42 of the vehicle body 11.

Figure 5:
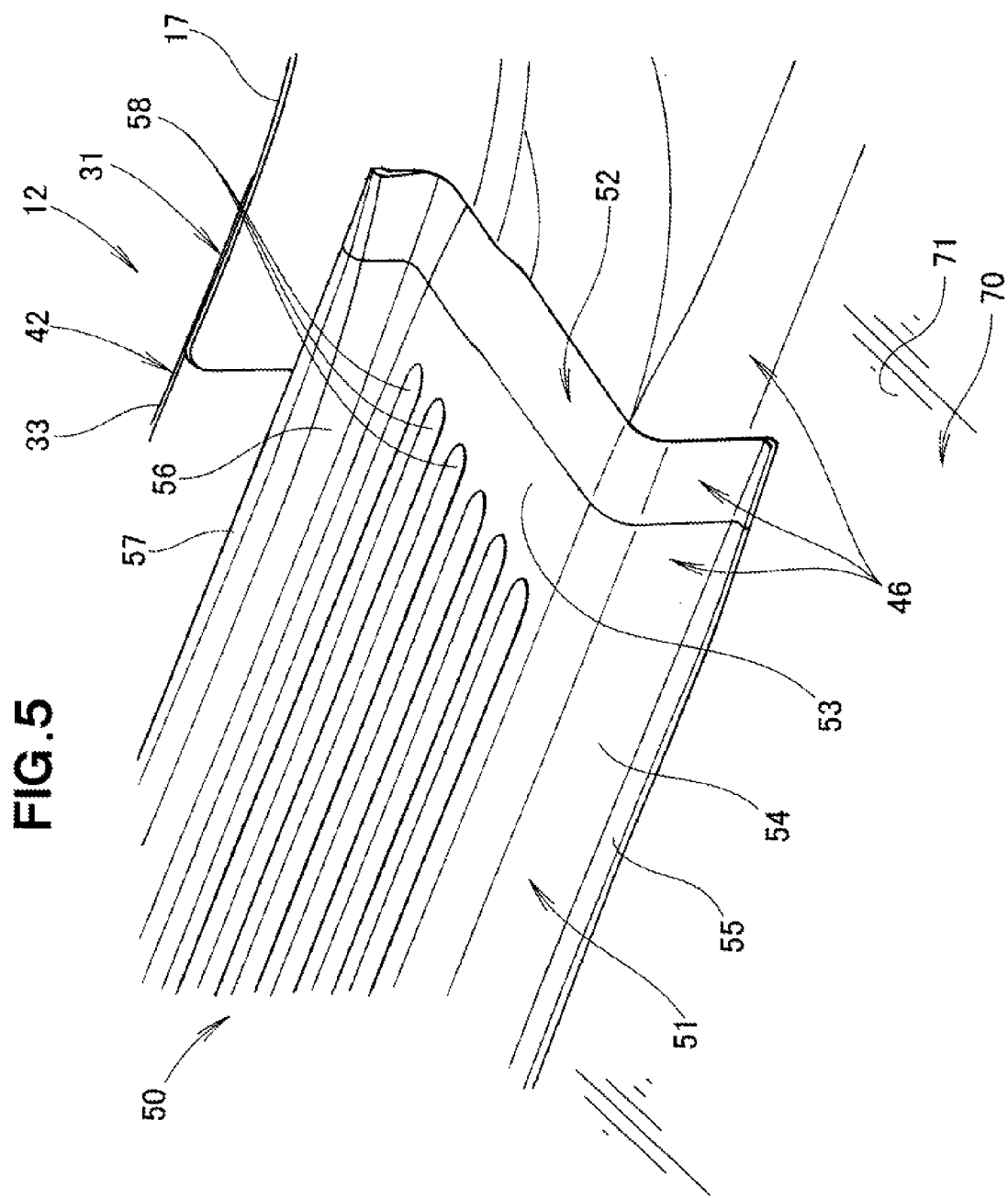
FIG. 5 is an enlarged view showing principal sections of the step garnish shown in FIG. 4.

Further, as shown in FIG. 5, the side sill 12 includes the joint section 31 where two plate materials of the outer side sill element 33 and the rear panel 17 are lapped over and joined to each other. The step garnish 50 is disposed so as to cover the joint section 31. The garnish body 51 has a plurality of grooves 58 formed in the upper wall 53 and extending in a longitudinal direction of the garnish body 51. With such grooves 58, the garnish body 51 can have an increased rigidity.

The lower flange 55 is formed at the lower end of the garnish end section 52, i.e. below the seal contact portion 46, and integrally with the lower flange 55 of the garnish body 51. Such a lower flange 55 on the garnish end section 52 has a large thickness although the garnish end section 52 gets smaller and smaller in thickness toward the distal end, and formability of resin can be increased. Further, even though molded of soft resin, a lower end portion of the garnish end section 52 can be increased in rigidity.

Further, the upper flange 56 is formed on an upper portion of the garnish end section 52 and integrally with the upper flange 56 of the garnish body 51, and the upper bent portion 57 is formed at the upper end of the garnish end section 52 and integrally with the upper bent portion 57 of the garnish body 51. Such an upper flange 56 and upper bent portion 57 on the garnish end section 52 have a large thickness although they get smaller and smaller in thickness toward the distal end of the garnish end section 52, and formability of resin can be increased. Further, even though molded of soft resin, an upper end portion of the garnish end section 52 can be increased in rigidity.

The following describe a state of the vehicle side body structure with the step garnish and the side sill garnish mounted on the side sill.

Figure 6:
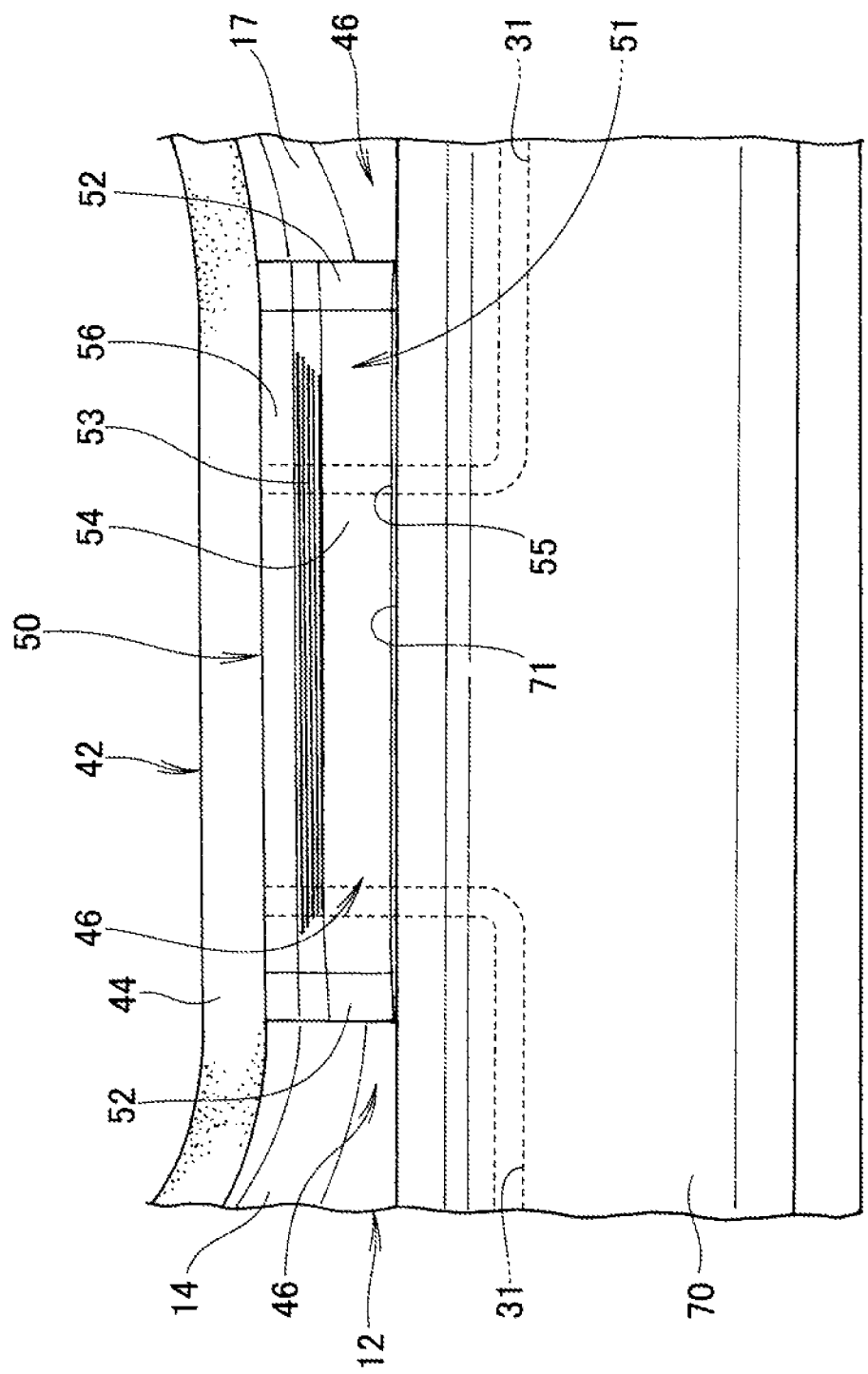
FIG. 6 is a view taken in the direction of arrow 6 of FIG. 4.

As shown in FIG. 6, the side sill garnish 70 is mounted on a side surface of the side sill 12, and the step garnish 50 is provided on an upper portion of the side sill 12 adjacent to the door opening 42. The joint sections 31 of the side sill 12 each have an L shape as viewed from a lateral side of the vehicle. An upper portion of each of the joint sections 31 is covered with the step garnish 50 and the opening seal member 44 while a lower portion of each of the joint sections 31 is covered with the side sill garnish 70, so that the joint sections 31 can be concealed from the outside.

The lower flange 55 of the step garnish 50 is placed on the upper surface 71 of the side sill garnish 70 along a longitudinal direction of the side sill garnish 70. The lower portion of each of the joint sections 31 of the side sill 12 is covered with the side sill garnish 70. The upper end of the upper flange 56 of the step garnish 50 is located close to the lower end of the opening seal member 44.

The following describe a state of the vehicle side body structure with the side sill garnish removed from the side sill.

Figure 7:
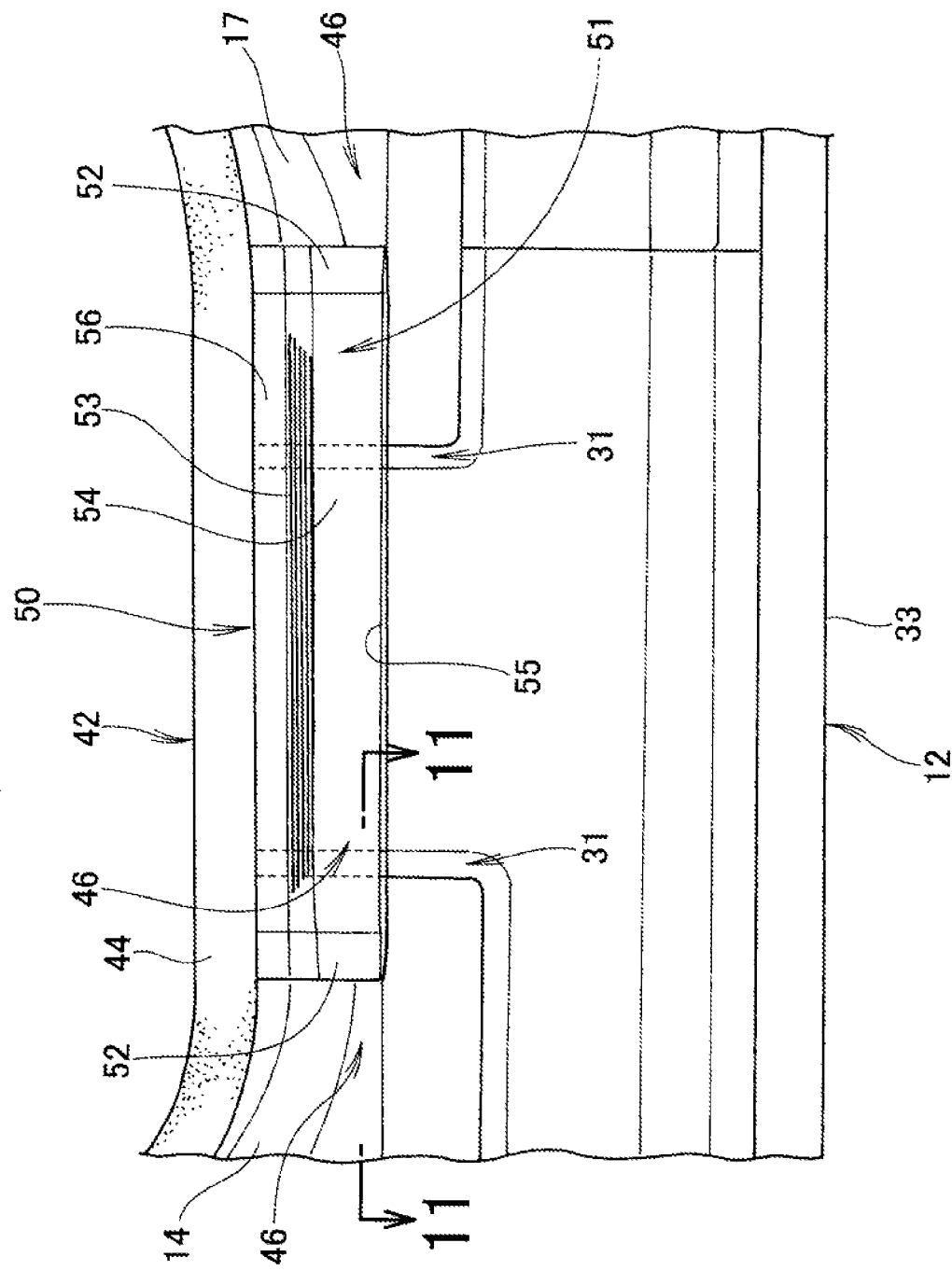
FIG. 7 is a view showing a construction with the side sill garnish removed from the side sill shown in FIG. 6.

As shown in FIG. 7, the upper portion of each of the joint sections 31 is covered with the step garnish 50. The side wall 54 of the step garnish 50 is disposed so as to extend continuously with the seal contact portion 46 of the center pillar 14 and the seal contact portion 46 of the rear panel 17.

The following describe a state of the vehicle body structure with the step garnish removed from the side sill.

Figure 8:
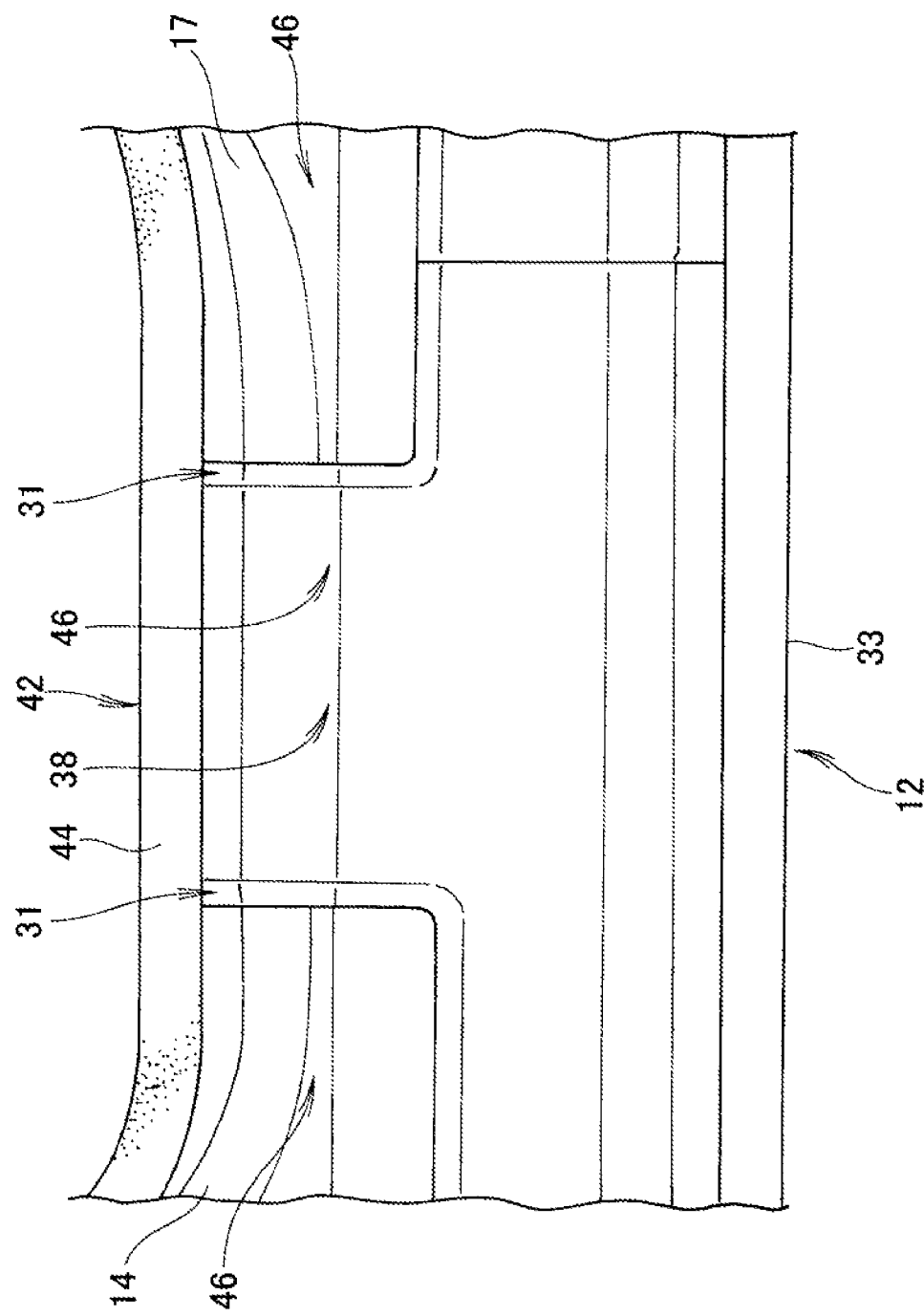
FIG. 8 is a view showing a construction with the step garnish removed from the side sill shown in FIG. 7.

As shown in FIG. 8, the side sill 12 has the joint section 31 where the outer side sill element 33 and the center pillar 14 are joined to each other, and the joint section 31 where the outer side sill element 33 and the rear panel 17 are joined to each other. The seal contact portions 46, which the door seal member 26 contacts when the door 22 (FIG. 2) is closed, are provided on the center pillar 14, outer side sill element 33 and rear panel 17, and these seal contact portions 46 extend substantively continuously with one another.

The following describe, with reference to a top plan view, a state of the vehicle side body structure with the step garnish mounted on the side sill.

Figure 9:
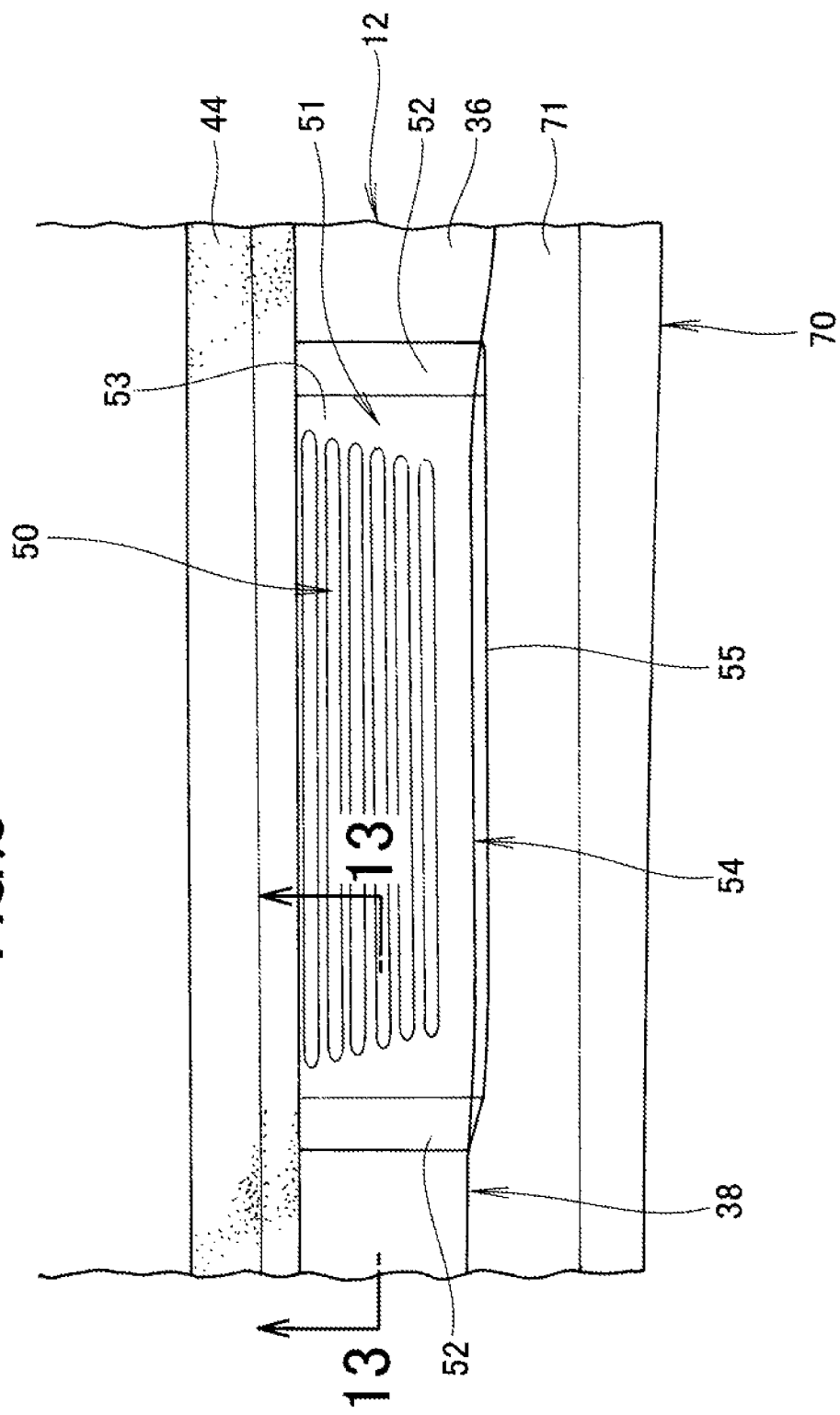
FIG. 9 is a view taken in the direction of arrow 9 of FIG. 4.

As shown in FIG. 9, a portion of the upper surface 36 is covered with the upper wall 53 of the step garnish 50, and a portion of the side surface 38 is covered with the side wall 54 of the step garnish 50. Further, the inner end, in the vehicle width direction, of the step garnish 50, is concealed by the opening seal member 44 as viewed in top plan. With such arrangements, dust etc. can be prevented from entering from above a gap between the inner end of the step garnish 50 and the side sill 12. Further, because the step garnish 50 has substantially the same width, in the vehicle width direction, as the upper surface 36 of the side sill 12, the passenger can easily place its foot (feet) on the step garnish 50, which thereby allows the passenger to get in and out of the vehicle with an increased ease.

Next, with reference to a bottom plan view, a description will be given about a manner in which the step garnish is mounted.

Figure 10:
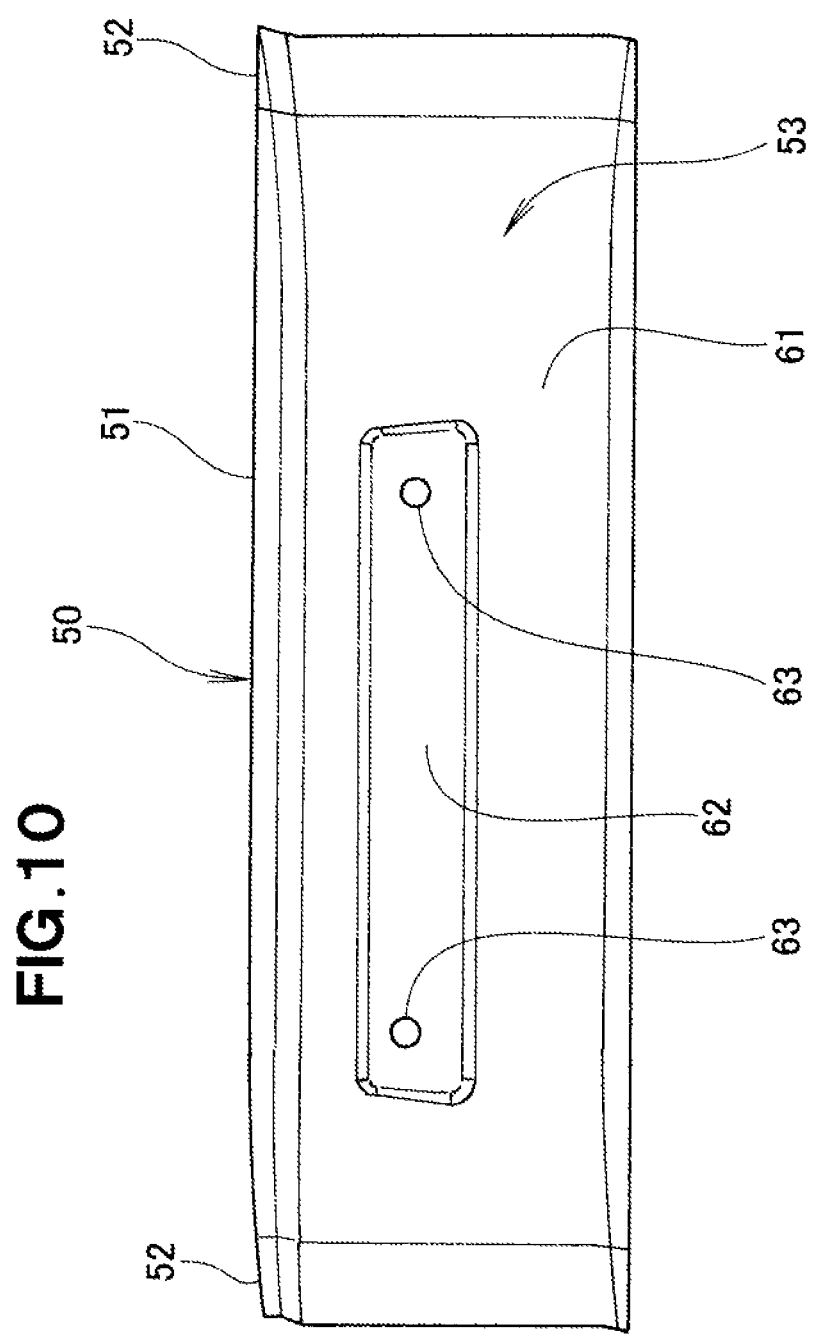
FIG. 10 is a bottom view of the step garnish shown in FIG. 9.

As shown in FIG. 10, a seating surface 62 is provided on the reverse surface 61 of the upper wall 53 of the step garnish 50, and clips 63 are provided on the seating surface 62. The seating surface 62 has a greater thickness than a portion surrounding the seating surface 62, so that it has an increased supporting rigidity. Mounting holes (not shown) are formed in the upper surface 36 of the side sill 12 (FIG. 9), and the clips 63 are inserted into these mounting holes so that the step garnish 50 is fixed to the side sill 12.

Note that the reverse surface 61 of the step garnish 50 and the upper surface 36 of the side sill 12 may be bonded together by adhesive.

The following describe, with reference to a sectional side view of the side sill, a thickness of the step garnish 50.

Figure 11:
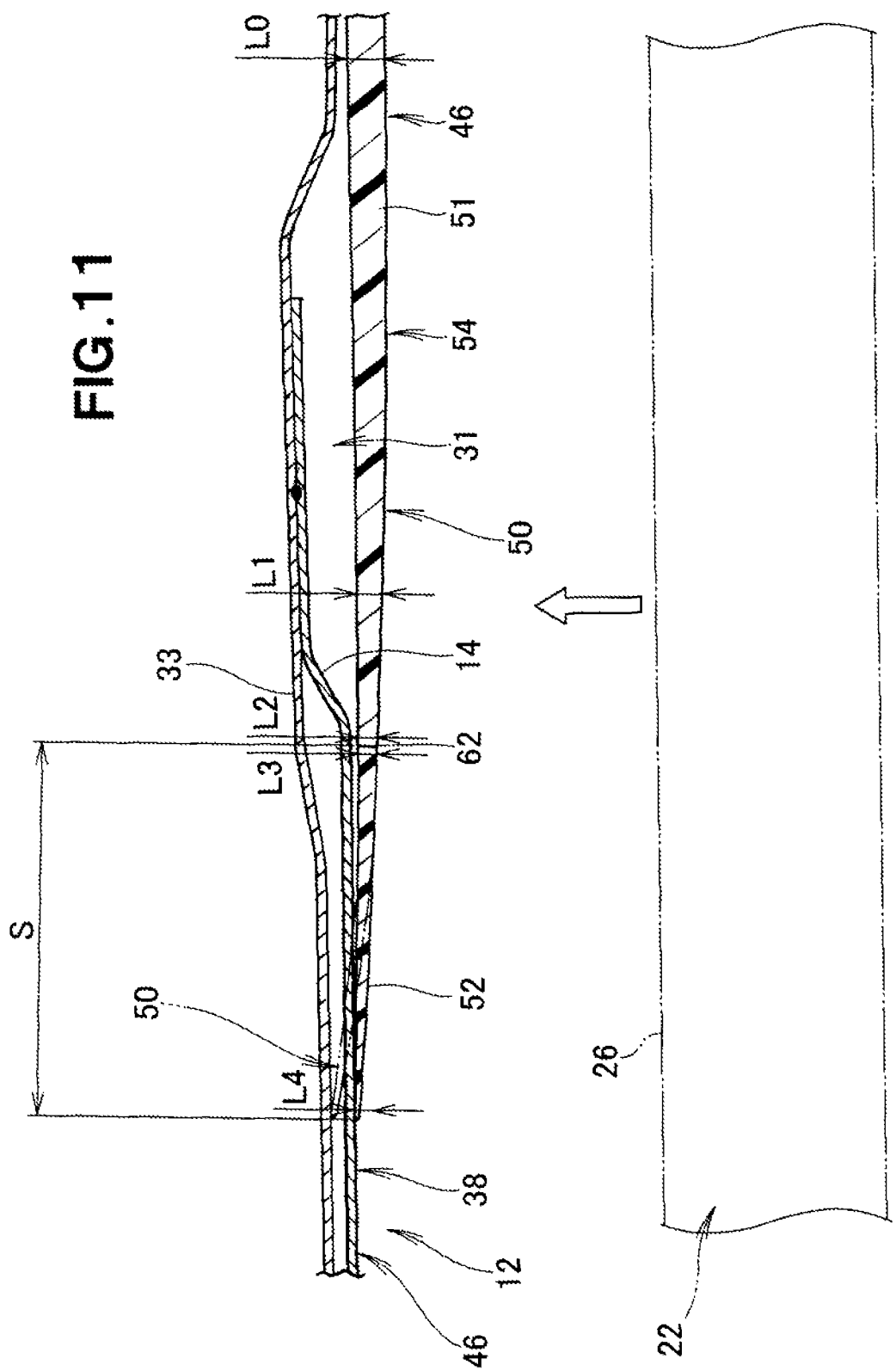
FIG. 11 is a sectional view taken along line 11-11 of FIG. 7.

As shown in FIG. 11, the center pillar 14 is welded to the outer side sill element 33. The garnish end section 52 is formed integrally with an end 62 of the garnish body 51. The joint section 31 is hollowed inwardly and covered with the garnish body 51.

The garnish body 51 has a thickness L0 at a middle portion thereof, a thickness L1 at a portion thereof near the joint section 31, and a thickness L2 at the end 62 of the garnish end section 52. Further, the garnish end section 52 has a thickness L3 at a portion thereof near the end 62 and a thickness L4 at its distal end.

The thickness of the garnish end section 52 gradually decreases from the end 62 of the garnish end section 52 toward the distal end, and the thickness of the garnish body 51 gradually decreases continuously from a middle portion of the garnish body 51 toward the distal end of the garnish end section 52, namely, $L4<L3$, $L3=L2$, $L2<L1<L0$.

Because not only the garnish end section 52 but also the garnish body 51 is formed to gradually decrease in thickness toward the distal end, the thickness of the end 62 of the garnish body 51 can be made smaller than the thickness of the middle portion of the garnish body 51, and the thickness L3 of a proximal end portion of the garnish end section 52 can be made small. Thus, it is possible to reduce a length S from the end 62 to the distal end of the garnish end section 52.

Further, the step garnish 50 depicted by imaginary line in FIG. 11 is in a state before being mounted on the side sill 12, and it is curved in a given direction such that a longitudinally middle portion thereof is spaced apart from the side surface 38 of the side sill 12. The step garnish 50 depicted by solid line in FIG. 11, on the other hand, is in a state having been duly mounted on the side sill 12, and its edge is kept in resilient contact with the side surface 38 of the side sill 12. Thus, the garnish end section 52 can be kept in close contact with the side surface 38 of the side sill 12.

The door 22 depicted by imaginary line in FIG. 11 is closed by being moved as indicated by an arrow. Note that the door seal member 26 depicted by imaginary line closely contacts the rear seal contact portion 46.

Next, a description will be given about a state of the vehicle side body structure when the door is the closed position.

Figure 12:
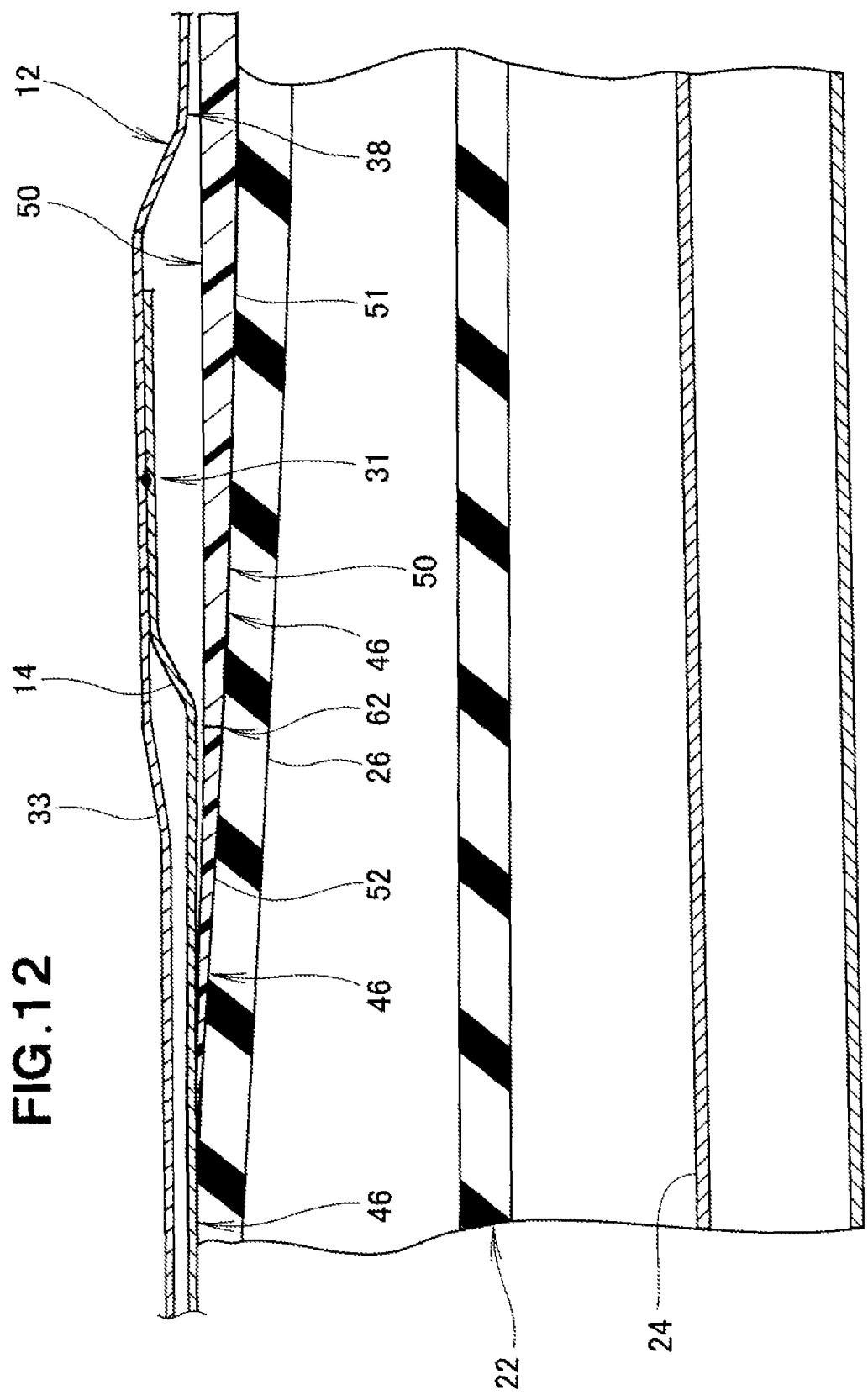
FIG. 12 is a sectional view taken along line 12-12 of FIG. 3.

As shown in FIG. 12, the step garnish 50 and the side sill 12 are connected smoothly; namely, the seal contact portions 46 extend continuously smoothly with no steps between the seal contact portions 46. The door seal member 26 closely contacts the garnish body 51, the garnish end section 52 and the side sill 12 with no gap therebetween. Thus, it is possible to secure an enhanced sealability between the door 22 and the side sill 12.

The following describe the thickness of the step garnish with reference to a sectional view of an upper portion of the side sill.

Figure 13:
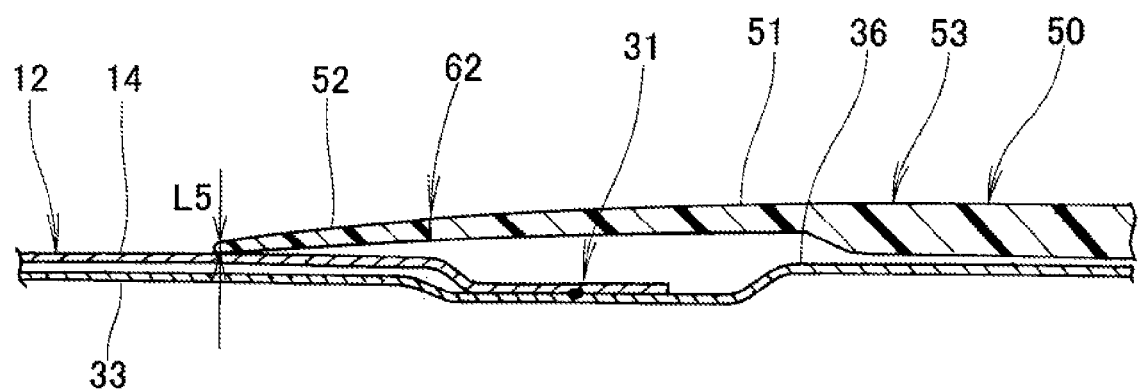
FIG. 13 is a sectional view taken along line 13-13 of FIG. 9.

As shown in FIG. 13, the garnish end section 52 is formed integrally with the end 62 of the garnish body 51, and the joint section 31 is covered with the garnish body 51.

The thickness of the garnish end section 52 gradually decreases from the end 62 of the garnish body 51 toward the distal end, and the thickness of the garnish body 51 gradually decreases continuously from the middle portion of the garnish body 51 to the distal end of the garnish end section 52.

The garnish end section 52 extending continuously from the upper wall 53 of the garnish body 51 has a thickness L5 at its distal end. The thickness L5 is greater than the thickness IA of the garnish end section 52 extending continuously from the side wall 54, i.e. L4<L5. Namely, if the thickness L5 is set relatively great, it is possible to not only increase mold-filling property of soft resin forming the garnish end section 52 but also increase overall rigidity of the garnish end section 52.

Further, because the garnish body 51 of hard resin is disposed over the joint section 31, the step garnish 50 would not deform along a hollow of the joint section 31, so that the step garnish 50 can be maintained in a predetermined shape.

Now, the above-described side vehicle body structure will be summarized below.

As shown in FIGS. 2 to 4, 11 and 12, the step garnish 50 is an integrally-molded member that comprises the garnish body 51 and the garnish end portions 52. The garnish body 51 covers a region from the upper surface 36 of the side sill 12 to an upper portion of the side surface 38 including the seal contact portions 46 and covers the joint sections 31 as well. Each of the joint sections 31 is where at least two plate materials are lapped over and joined to each other to constitute a part of the side sill 12. With the garnish body 51 covering such stepped joint sections 31 located on the lower edge of the door opening 42, it is possible to enhance the outer appearance of the lower edge of the door opening 42. Besides, because the garnish body 51 is formed of hard resin, it has rigidity great enough to allow a passenger's foot (feet) to be placed thereon.

The upper portion of the side surface, located outward in the vehicle width direction, is covered with the garnish body 51. A level difference corresponding to the thickness of the garnish body 51 is formed between each of the opposite ends, in the front-rear direction of the vehicle body, of the garnish body 51. By contrast, the garnish end section 52 formed of soft resin has considerable flexibility. Besides, the thickness of the garnish end section 52 gradually decreases from the proximal end, formed integrally with the garnish body 51, toward the distal end. Namely, the garnish end section 52 is formed integrally with one of the ends, in the front-rear direction of the vehicle body, of the garnish body 51 and covers at least the seal contact portions 42. In other words, the garnish end section 52 has a gently sloping shape so as to avoid formation of a level difference. Thus, no gap is formed between the upper portion of the outer side surface of the side sill 12 and the door seal member 26, which can enhance the sealability between the door opening 42 and the door 22.

In the aforementioned manner, it is possible to improve the outer appearance of the lower edge of the door opening 42 and the sealability along the door opening 42.

As shown in FIG. 11, the thickness of the garnish body 51 decreases gradually and continuously from its middle portion toward its distal end; namely, the thickness of the garnish body 51 is smaller at the end in the front-rear direction of the vehicle body than at the middle portion. The thickness of the proximal end of the garnish end section 52 can be reduced by an amount corresponding to the reduced thickness of the end in the front-rear direction. Further, a length of the garnish end section 52 from the proximal end to the distal end can be reduced by an amount corresponding to the reduced thickness of the proximal end. Because of the reduced length of the garnish end section 52, it is possible to fill molten resin evenly into a cavity of a mold for forming the garnish end section 52 on the garnish body 51. Because the molten resin can be filled into the mold cavity in an appropriate manner as noted above, it is possible to achieve an enhance quality of the garnish end section 52.

Further, as shown in FIGS. 11 to 13, the step garnish 50 formed of resin is resiliently deformable, and before the step garnish 50 is mounted on the side sill 12, it is curved in the given direction such that the middle portion of the step garnish 50 is spaced apart from the upper surface 36 and side surface 38 of the side sill 12. The middle portion of the step garnish 50 is lapped over the upper surface 36 and side surface 38 of the side sill 12 by being placed over and pressed against the upper surface 36 and side surface 38 against the resiliency of the step garnish 50, so that the step garnish 50 is mounted on the side sill 12. In the state mounted on the side sill 12, the distal end of the garnish end portion is resiliently pressed against the upper surface 36 and side surface 38 of the side sill 12 and thus kept in close contact with the upper surface 36 and side surface 38 with no gap formed between the distal end and the upper surface 36 and side surface 38. With no gap formed between the distal end and the upper surface 36 and side surface 38, it is possible to even further enhance the outer appearance of the lower edge of the door opening 42 (see FIG. 6) and the sealing performance along the periphery of the door opening 42.

As further shown in FIGS. 11 to 13, of a distal end part of the garnish end section 52, a potion contacting the upper surface 36 of the side sill 12 has a greater thickness than a portion contacting the seal contact portion 46. Namely, the portion of the garnish end section 52 contacting the door seal portion 26 has a smaller thickness such that no gap is left between that portion and the door seal portion 26. The portion of the garnish end section 52 contacting the upper surface 36 of the side sill 12, on the other hand, may be formed to have a greater thickness than the portion of the garnish end section 52 contacting the seal contact portion 46, because it is provided only for the purpose of enhancing the outer appearance of the lower edge of the door opening 46. Because the portion of the distal end part of the garnish end section 52 has a greater thickness as noted above, it is possible to fill molten soft resin evenly into a portion, corresponding to the distal end part, of the cavity of the mold. Because the molten resin can be filled into the mold cavity in an appropriate manner as noted above, it is possible to achieve an enhanced overall quality of the garnish end section 52. As a result, it is possible to enhance an overall rigidity of the garnish end section 52.

Further, as shown in FIG. 3, a portion of the outer side surface 38, in the vehicle width direction, of the side sill 12, which is not covered with the garnish body 51, is covered with the side sill garnish 70. The garnish body 51 includes the lower flange 55 extending outward in the vehicle width direction from the lower end of the side wall 54 along the upper surface 71 of the side sill garnish 70, and this lower flange 55 is placed on the upper surface 71 of the side sill garnish 70. Because frictional resistance is produced between the lower flange 55 and the upper surface 71 of the side sill garnish 70, the side wall 54 of the garnish body 51 can be prevented or restrained from deforming laterally outwardly in the vehicle width direction. Besides, because the lower flange 55 extends outward in the vehicle width direction from the lower end of the side wall 54 and is placed on the upper surface 71 of the side sill garnish 70, a gap, if any, between the lower end of the side wall 54 and the upper surface 71 of the side sill garnish 70 is hardly visible, and thus, it is possible to even further enhance the outer appearance of the lower edge of the door opening 42.

As further shown in FIG. 3, the garnish body 51 includes the upper flange 56 extending upward from the inner end, in the vehicle width direction, of the upper wall 53 covering the upper surface of the side sill 12. The upper end of the upper flange 56 is located close to the lower end of the opening seal member 44 provided on the lower edge of the door opening 42. As the door 22 is closed, the door opening seal 44 contacts the upper end of the upper flange 56 while elastically deforming to collapse. Because the door opening seal 44 is prevented or restrained from deforming downward by contacting the upper end of the upper flange 56, contact pressure between the door opening seal 44 and the lower edge of the inner surface of the door 22 increases. As a consequence, sealability between the lower edge of the inner surface of the door 22 and the door opening seal 44 increases so that waterproofness and sound insulation can be significantly increased. Particularly, when the door 22 is in the closed position, it is possible to sufficiently secure double sealing by the door seal member 26 and the opening seal member 44.

Note that, whereas the instant embodiment has been described above in relation to the case where the garnish body 51 and the garnish end section 52 are curved relative to the side sill 12, the present invention is not so limited, and only the garnish end section 52 may be curved relative to the side sill 12 with the garnish body 51 formed in a straight shape.

INDUSTRIAL APPLICABILITY

The vehicle body of the present invention is well suited for application to automobiles which include a door opening formed in a side section of the vehicle body with the lower edge thereof defined by the upper surface of a side sill and a door for opening and closing the door opening.

REFERENCE SIGNS LIST

10 . . . automobile (vehicle), 11 . . . vehicle body, 12 . . . left and right, side sills, 14 . . . left and right center pillars (plate materials), . . . 17 left and right rear panels (plate materials), 21 . . . front door (door), 22 . . . rear door (door), 26 . . . door seal member, 31 . . . joint section, 33 . . . outer side sill element (plate material), 36 . . . upper surface of the side sill, 38 . . . side surface (outer surface) of the side sill, 41 . . . left and right front door openings, 42 . . . left and right rear door openings, 43 . . . front opening seal member (door opening seal), 44 . . . rear opening seal member (door opening seal), 45 . . . front seal contact portion (seal surface), 46 . . . rear seal contact portion (seal surface), 50 . . . step garnish, 51 . . . garnish body, 52 . . . garnish end section, 53 . . . upper wall, 54 . . . side wall, 55 . . . lower flange, 56 . . . upper flange, 62 . . . end of the garnish body, 70 . . . side sill garnish, 71 . . . upper surface of the side sill garnish

The invention claimed is:

1. A vehicle side body structure including: a side sill provided in a lower portion of a side section of a vehicle body and extending in a front-rear direction of the vehicle body; and a door opening formed in the side section of the vehicle body, a lower edge of the door opening being defined by an upper surface of the side sill, the side sill having a joint section where a plurality of plate materials are lapped over and joined to each other, the door opening being opened and closed by a door having a door seal member on a lower edge portion of the door, wherein, when the door is in a closed position, the door seal member seals the door by contacting a seal contact portion on an upper portion of an outer side surface, located outward in a vehicle with direction, of the side sill, characterized in that a step garnish is provided on a portion of the side sill adjacent to the door opening, the step garnish covering at least a part of the portion of the side sill in such a manner as to allow a foot of a passenger to be placed thereon, the step garnish is an integrally-molded member including a garnish body formed of hard resin and a garnish end section formed of soft resin, the garnish body covers a region from the upper surface of the side sill to the upper portion of the side surface including the seal contact portion and covers the joint section as well, the garnish end section is formed integrally with an end, in the front-rear direction of the vehicle body, of the garnish body and covering at least the seal contact portion, a thickness of the garnish end section gradually decreases from a proximal end thereof formed integrally with the garnish body toward a distal end thereof.

2. The vehicle side body structure according to claim 1, wherein a thickness of the garnish body gradually decreases in such a manner that the thickness gradually decreases continuously from a middle portion of the garnish body to the distal end of the garnish end section.

3. The vehicle side body structure according to claim 1, wherein, before being mounted on the side sill, the step garnish is curved in a given direction such that a middle portion thereof is spaced from the upper surface and the side surface of the side sill, so that, when the step garnish is mounted on the side sill, an edge of the step garnish resiliently contacts the upper surface and the side surface of the side sill.

4. The vehicle side body structure according to claim 1, wherein, of a distal end part of the garnish end section, a portion contacting the upper surface of the side sill has a greater thickness than a portion contacting the seal contact portion.

5. The vehicle side body structure according to claim 1, wherein, of the outer side surface, located outward in the vehicle with direction, of the side sill, a portion not covered with the garnish body is covered with a side sill garnish, and wherein the garnish body has a lower flange extending outward in the vehicle width direction from a lower end of a side wall, covering the side surface of the side sill, along an upper surface of the side sill garnish, and the lower flange is placed on the upper surface of the side sill garnish.

6. The vehicle side body structure according to claim 1, wherein an opening seal member is provided on the lower edge of the door opening, and the opening seal member is a member for sealing the door by a lower edge of an inner surface of the door contacting the opening seal member when the door is in the closed position, and wherein the garnish body has an upper flange extending upward from an inner end, in the vehicle width direction, of an upper wall covering the upper surface of the side sill, and an upper end of the upper flange is located near a lower end of the opening seal member.

\* \* \* \* \*